United States Patent
Alexander et al.

(10) Patent No.: US 8,398,101 B2
(45) Date of Patent: Mar. 19, 2013

(54) AXLE TUBES INCLUDING PROTRUSION AND VEHICLE INCLUDING SAME

(75) Inventors: Matthew J. Alexander, Hilliard, OH (US); Yoshiaki Noda, Dublin, OH (US); Lee N. Bowers, Springfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 140 days.

(21) Appl. No.: 13/023,897

(22) Filed: Feb. 9, 2011

(65) Prior Publication Data

US 2012/0200055 A1 Aug. 9, 2012

(51) Int. Cl.
*B60G 9/02* (2006.01)
*B60G 13/00* (2006.01)
*B60G 15/02* (2006.01)
*B60G 7/02* (2006.01)

(52) U.S. Cl. .......... 280/124.116; 280/124.156; 301/126; 301/137; 74/607

(58) Field of Classification Search ........... 280/124.116, 280/124.11, 124.156, 124.128, 124.132, 280/157, 124.157, 124.1; 301/125, 124.1, 301/126, 137; 74/607; *B60G 9/02, 13/00, B60G 13/02, 13/04, 15/00, 15/04, 15/06, B60G 15/02, 7/00, 7/02*
See application file for complete search history.

(56) References Cited

U.S. PATENT DOCUMENTS

| | | | |
|---|---|---|---|
| 6,102,417 A | 8/2000 | Moore | |
| 6,837,508 B2 | 1/2005 | Francis et al. | |
| 6,907,774 B2 * | 6/2005 | Kurecka et al. | 73/115.06 |
| 7,537,290 B2 | 5/2009 | Tye et al. | |
| 7,798,505 B2 * | 9/2010 | Neag et al. | 280/124.1 |
| 7,896,369 B2 * | 3/2011 | Tomlin et al. | 280/124.116 |
| 7,931,557 B2 * | 4/2011 | Zink | 475/246 |
| 7,984,552 B2 * | 7/2011 | Doud et al. | 29/897.2 |
| 2008/0084047 A1 * | 4/2008 | Bluff et al. | 280/423.1 |
| 2008/0224437 A1 | 9/2008 | Vanhees | |
| 2009/0072505 A1 * | 3/2009 | McGinnis | 280/124.116 |

* cited by examiner

*Primary Examiner* — Paul N Dickson
*Assistant Examiner* — Keith Frisby
(74) *Attorney, Agent, or Firm* — Ulmer & Berne LLP

(57) ABSTRACT

A vehicle includes a frame, a swing member, an axle tube, a cushion bracket, a protrusion, an axle, and a cushion member. The swing member is pivotable about a first axis. The axle tube is coupled with the swing member, the cushion bracket, and the protrusion. The axle is rotatable about a second axis. The cushion member includes lower and upper ends. The lower end is pivotally coupled with the cushion bracket and is pivotable about a third axis. The second and third axes reside in a first plane. The protrusion is located above the first plane and is spaced from the cushion member by a first distance having a minimum value. The lower end of the cushion member is spaced from the axle tube by a second distance having a minimum value. The minimum value of the first distance is less than the minimum value of the second distance.

20 Claims, 5 Drawing Sheets

AXLE TUBES INCLUDING PROTRUSION AND VEHICLE INCLUDING SAME

TECHNICAL FIELD

A swing arm assembly includes an axle tube that includes a protrusion.

BACKGROUND

A conventional vehicle includes a rear swing arm assembly which supports a rear axle tube. Cushion members are pivotally coupled with the rear axle tube. During operation, debris can become lodged between the cushion member and the rear axle tube. When the cushion member compresses to accommodate for upward pivoting of the rear swing arm assembly, the debris becomes pinched between and damages the cushion member and/or axle tube.

SUMMARY

A vehicle comprises a frame, a swing member, an axle tube, a cushion bracket, a protrusion, an axle, and a cushion member. The swing member is pivotally coupled with the frame and is pivotable about a first axis. The axle tube is coupled with the swing member and comprises a radius. A cushion bracket is coupled with the axle tube. The protrusion is coupled with the axle tube adjacent the cushion bracket and extends outwardly from the axle tube. The axle is rotatably supported by the axle tube and is rotatable about a second axis. The cushion member comprises a lower end and an upper end. The upper end of the cushion member is pivotally coupled with the frame. The lower end of the cushion member is pivotally coupled with the cushion bracket and is pivotable about a third axis. The second axis and the third axis reside in a first plane. The second axis resides in a second plane that is perpendicular to the first plane. The protrusion is located above the first plane. The cushion member is spaced from the protrusion by a first distance having a minimum value. The lower end of the cushion member is spaced from the axle tube by a second distance having a minimum value. The minimum value of the first distance is less than the minimum value of the second distance.

A swing arm assembly comprises an axle tube, a cushion bracket, a protrusion, an axle, and a cushion member. The axle tube is coupled with the swing member and comprises a radius. The cushion bracket is coupled with the axle tube. The protrusion is coupled with the axle tube adjacent the cushion bracket and extends outwardly from the axle tube. The axle is rotatably supported by the axle tube and is rotatable about a first axis. The cushion member comprises a tower end and an upper end. The upper end of the cushion member is configured for pivotal coupling with a vehicular frame. The lower end of the cushion member is pivotally coupled with the cushion bracket and is pivotable about a second axis. The first axis and the second axis reside in a first plane. The second axis resides in a second plane that is perpendicular to the first plane. The protrusion is located above the first plane. The cushion member is spaced from the protrusion by a first distance having a minimum value. The lower end of the cushion member is spaced from the axle tube by a second distance having a minimum value. The minimum value of the first distance is less than the minimum value of the second distance.

A vehicle comprises a frame, a swing member, a left axle tube, a right axle tube, a left cushion bracket, a right cushion bracket, a left protrusion, a right protrusion, a left axle, a right axle, and a pair of cushion members. The swing member is pivotally coupled with the frame and is pivotable about a first axis. The left axle tube is coupled with the swing member. The right axle tube is coupled with the swing member. The left cushion bracket is coupled with the left axle tube. The right cushion bracket is coupled with the right axle tube. The left protrusion is coupled with the left axle tube adjacent the left cushion bracket and extends outwardly from the left axle tube. The right protrusion is coupled with the right axle tube adjacent the right cushion bracket and extends outwardly from the right axle tube. The left axle is rotatably supported by the left axle tube and is rotatable about a second axis. The right axle is rotatably supported by the right axle tube and is rotatable about a third axis. Each cushion member of the pair of cushion members comprises a lower end and an upper end. The upper end of each cushion member is pivotally coupled with the frame. The lower end of one cushion member is pivotally coupled with the left cushion bracket and is pivotable about a fourth axis. The lower end of the other cushion member is pivotally coupled with the right cushion bracket and is pivotable about a fifth axis. The second axis and the fourth axis reside in a first plane. The second axis resides in a second plane that is perpendicular to the first plane. The third axis and the fifth axis reside in a third plane. The third axis resides in a fourth plane that is perpendicular to the third plane. The left protrusion is located above the first plane and forwardly of the second plane. The right protrusion is located above the third plane and forwardly of the fourth plane. The cushion member attached to the left cushion bracket is spaced from the left protrusion by a first distance having a minimum value. The lower end of the cushion member attached to the left cushion bracket is spaced from the left axle tube by a second distance having a minimum value. The cushion member attached to the left cushion bracket is spaced from the left axle tube by a third distance having a minimum value. The cushion member attached to the right cushion bracket is spaced from the right protrusion by a fourth distance having a minimum value. The lower end of the cushion member attached to the right cushion bracket is spaced from the right axle tube by a fifth distance having a minimum value. The cushion member attached to the right cushion bracket is spaced from the right axle tube by a sixth distance having a minimum value. The minimum value of the first distance is less than the minimum values of the second distance and the third distance. The minimum value of the fourth distance is less than the minimum values of the fifth distance and the sixth distance.

BRIEF DESCRIPTION OF THE DRAWINGS

Various embodiments will become better understood with regard to the following description, appended claims, and accompanying drawings wherein:

DETAILED DESCRIPTION

Figure 1:
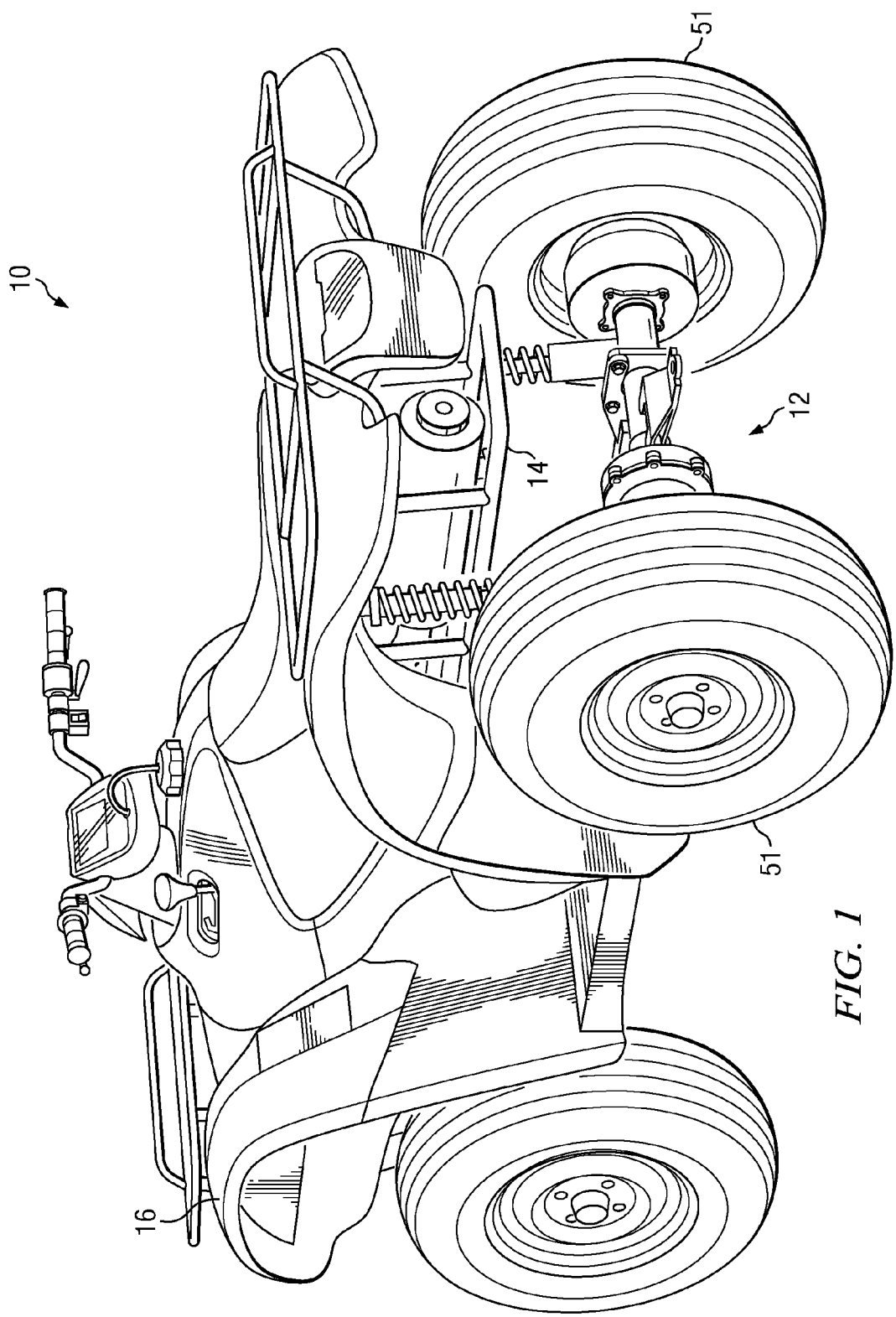
FIG. 1 is a rear perspective view depicting a vehicle in accordance with one embodiment.

The present invention and its operation are hereinafter described in detail in connection with the views and examples of FIGS. 1-7, wherein like numbers indicate the same or corresponding elements throughout the views. A vehicle 10 can include a swing arm assembly 12 in accordance with one embodiment. As illustrated in FIG. 1, the vehicle 10 can be an all terrain vehicle (ATV), but in other embodiments, the vehicle 10 can be an automobile, a recreational vehicle, of a utility vehicle, for example. The vehicle 10 can include frame 14 that is shown to have a tubular construction. The frame 14, however, can be provided in any of a variety of other suitable arrangements, such as in a unibody construction, for example, and can be formed using any of a variety of materials, such as metal or carbon fiber, for example. The frame 14 can support a body 16 which in some embodiments can include a variety of decorative panels.

Figure 2:
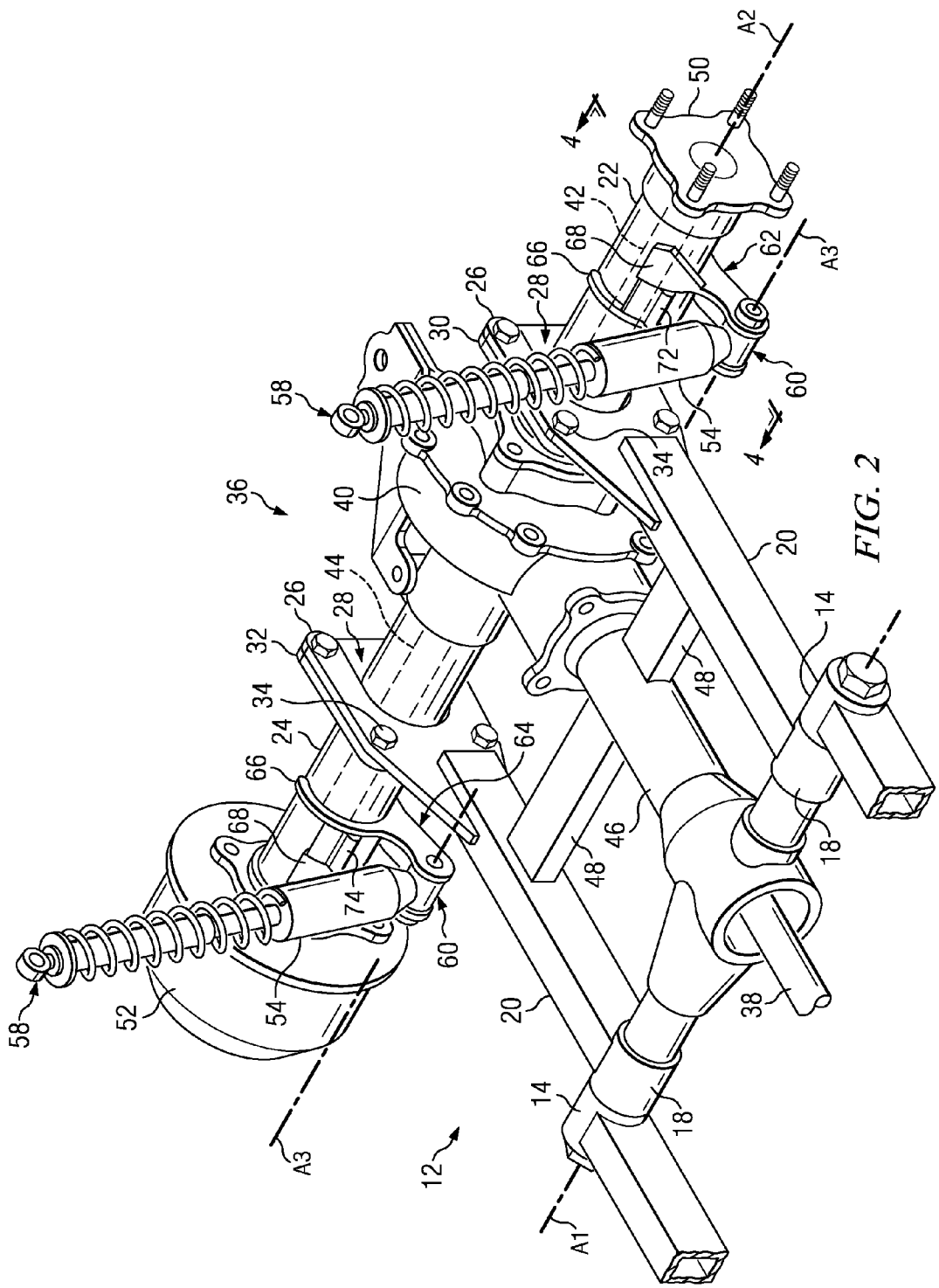
FIG. 2 is an enlarged perspective view depicting a swing arm assembly in connection with various other components of the vehicle of FIG. 1.

The swing arm assembly 12 can be pivotally coupled with the frame 14, such as with bolts as illustrated in FIG. 2. The swing arm assembly 12 can include a pair of pivotal supports 18 that are coupled with a pair of swing members 20. In one embodiment, the pivotal supports 18 can comprise annular members. In such an embodiment, pins (not shown) can be provided through the frame 14 and each of the pivotal supports 18 to facilitate pivoting of the swing arm assembly 12 with respect to the frame 14 about an axis A1. It will be appreciated that the swing arm assembly 12 can be pivotally coupled to a frame in any of a variety of suitable alternative arrangements.

The swing arm assembly 12 can include a left axle tube 22 and a right axle tube 24. As illustrated in FIG. 2, the swing arm assembly 12 can include a pair of axle support brackets 26 that can be coupled with the swing members 20 opposite the pivotal supports 18. The axle support brackets 26 can be c-shaped brackets that define a slot 28 for receiving one of the respective left and right axle tubes 22, 24. Each of the left and right axle tubes 22, 24 can be disposed within one of the slots 28. Each of the axle support brackets 26 can be coupled with one of a left and right axle flange 30, 32 of the left and right axle tubes 22, 24 with bolts 34. It will be appreciated that the axle support brackets 26 can be coupled with the swing members 20 through welding, with bolts, or formed as a one-piece construction with the swing members 20, for example. It will also be appreciated that although the left and right axle tubes 22, 24 are shown to be coupled with the swing arm assembly 12 with axle support brackets and bolts, left and right axle tubes can be coupled with a swing arm assembly 12 in any of a variety of suitable alternative arrangements. For example, the left and right axle tubes 22, 24 can be coupled directly to the axle support brackets 26 without use of axle flanges.

The vehicle 10 can include a rear drive train 36 that includes a drive shaft 38, a rear final gear 40, and left and right axles 42, 44. As illustrated in FIG. 2, the swing arm assembly 12 can include a drive shaft column 46 that can be secured to the swing members 20 by a plurality of cross members 48. The drive shaft 38 can be rotatably supported by the drive shaft column 46 and can couple the rear final gear 40 with a motive power source (e.g., an engine) of the vehicle 10. The left and right axles 42, 44 can be rotatably supported by the respective left and right axle tubes 22, 24 and can each be coupled with the rear final gear 40 such that rotation of the drive shaft 38 (e.g., with the motive power source) facilitates rotation of the left and right axles 42, 44 about a axis A2 (shown in FIG. 2). In one embodiment, the drive shaft 38, the left axle 42, and the right axle 44 can each be rotatably supported with respect to the drive shaft column 46, the left axle tube 22 and the right axle tube 24, respectively, by bearings (not shown).

The left axle 42 can be coupled with a left hub 50 and the right axle 44 can be coupled with a brake assembly 52. Left and right rear wheels (e.g., 51 shown in FIG. 1) can be supported by the left hub 50 and the brake assembly 52, respectively. The brake assembly 52 can facilitate selective braking of the vehicle 10. The brake assembly 52 can be manually operated by a user through operation of a handlebar-mounted handle, a brake pedal, or any of a variety of other suitable brake actuation devices. Although the brake assembly 52 is shown to be a drum-type brake arrangement, it will be appreciated that any of a variety of suitable alternative brake arrangements, such as a disk-type brake, can be used.

As illustrated in FIG. 2, the vehicle 10 can include a pair of cushion members 54 that each includes an upper end 58 and a lower end 60. The left axle, tube 22 can include a left cushion bracket 62 and the right axle tube 24 can include a right cushion bracket 64. The lower ends 60 of each cushion member 54 can be pivotally coupled with one of the left and right cushion brackets 62, 64. In one embodiment, as illustrated in FIG. 2, the left and right cushion brackets 62, 64 can each include a pair of vertical attachment flanges 66, 68. The lower end 60 of each cushion member 54 can be interposed between a pair of the attachment flanges 66, 68 and pivotally coupled with the respective attachment flanges 66, 68 by pins, bolts or otherwise. The lower ends 60 of the cushion members 54 can accordingly be pivotable about an axis A3. The upper ends 58 of the cushion members 54 can be pivotally coupled with the frame 14.

The cushion members 54 can be configured to dampen shock impulses provided to the swing arm assembly 12 such as when the vehicle 10 traverses uneven terrain. In one embodiment, the cushion members 54 can comprise a hydraulic coil-over-damper type shock absorber, but in other embodiments can comprise any of a variety of suitable alternative dampers, such as an electromagnetic-type damper, for example. Although the pair of cushion members 54 are described above, it will be appreciated that, in some embodiments, the vehicle 10 might only include one cushion member (e.g., mounted adjacent to the rear final gear) or might include three or more cushion members.

As illustrated in FIG. 2, the left and right cushion brackets 62, 64 can extend forwardly from the left and right axle tubes 22, 24 such that the lower ends 60 of the cushion members 54 are disposed forwardly of the left and right axle lubes 22, 24. When the swing arm assembly 12 is pivoted upwardly with respect to the frame 14, such as when the rear of the vehicle 10 jounces or rolls, the cushion members 54 can compress and can pivot rearwardly towards the left and right axle tubes 22, 24. The left and right cushion brackets 62, 64 can be susceptible to collecting debris which could become pinched between and damage the cushion members 54, the left axle tube 22, and/or the right axle tube 24.

Figure 3:
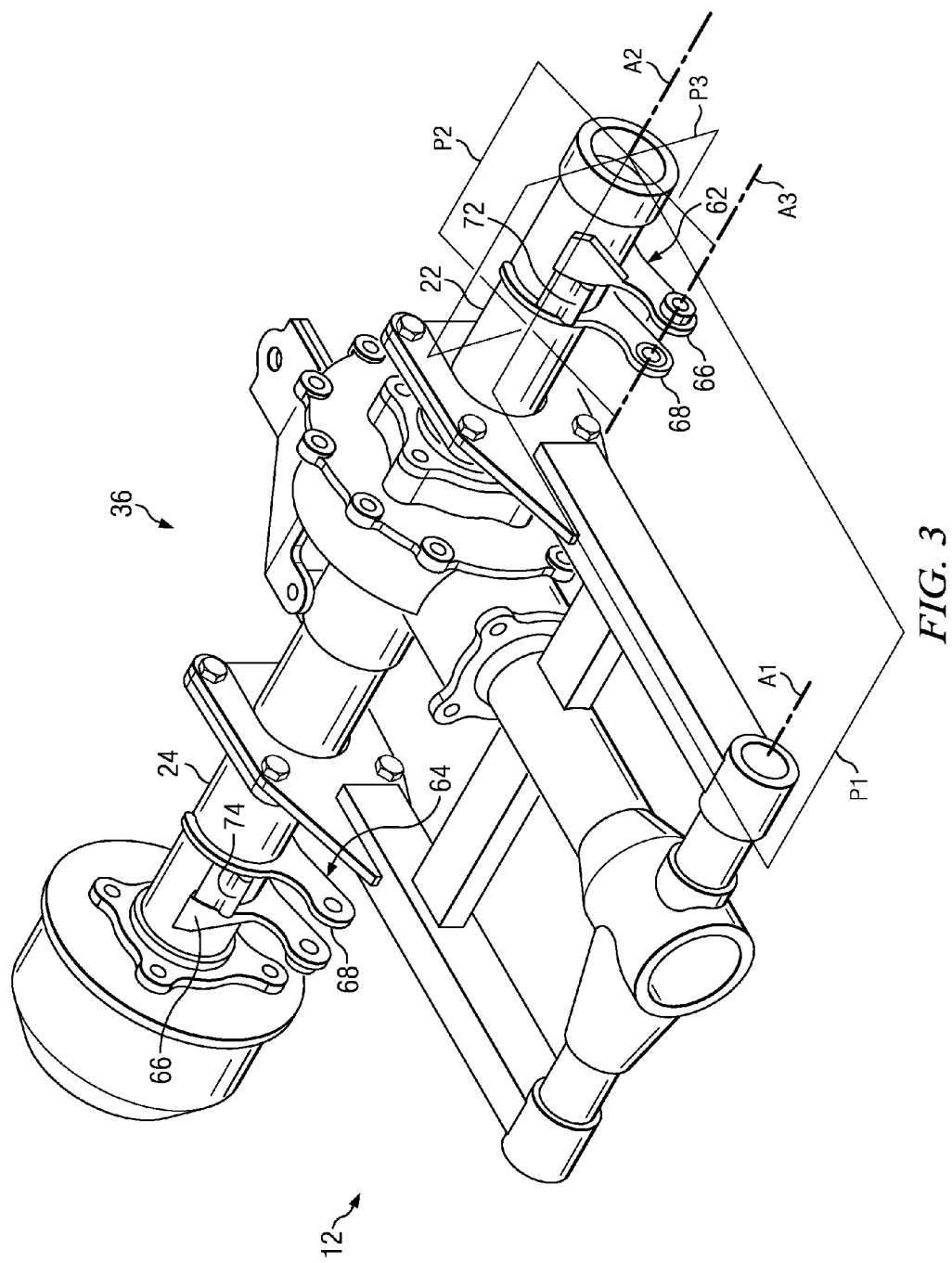
FIG. 3 is an enlarged perspective view of the swing arm assembly of FIG. 2 but with certain components removed for clarity of illustration.
Figure 4:
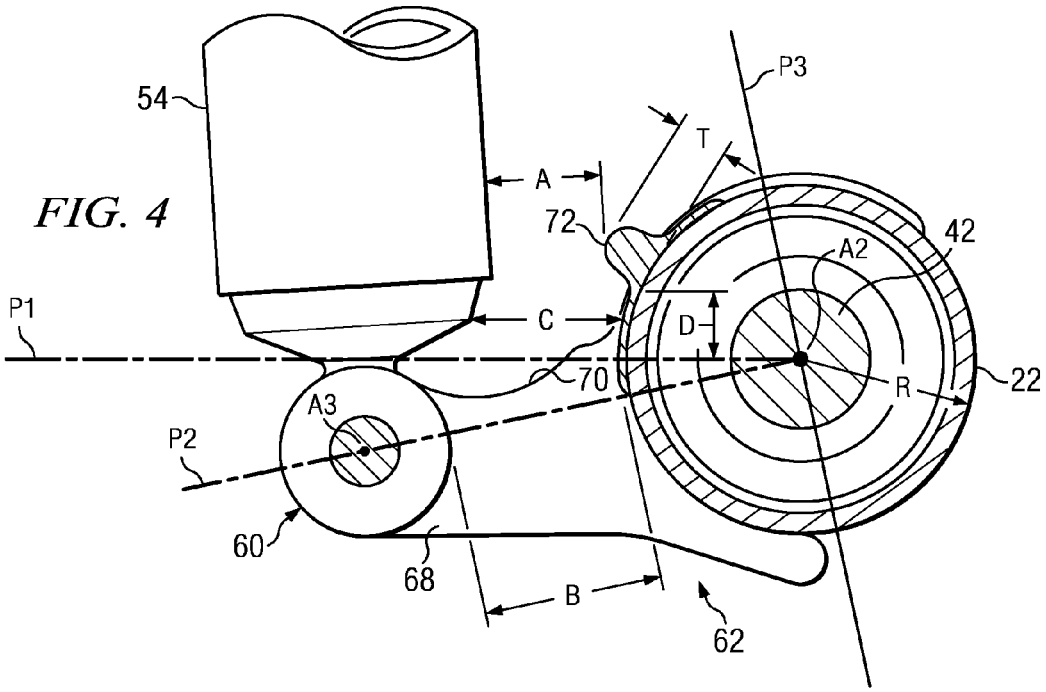
FIG. 4 is cross-sectional view of a left axle tube, a cushion member, and a left cushion bracket taken along section line 4-4 in FIG. 2, according to one embodiment.

For example, as illustrated in FIGS. 2 and 3, the axis A1 and the axis A2 reside in a plane P1. As illustrated in FIG. 4, the vertical attachment flanges 66, 68 of the left cushion bracket 62 can each define an upper surface 70 that extends at least partially beneath the plane P1. The lower end 60 of the cushion member 54 can be pivotally coupled with the vertical attachment flanges 66, 68 such that the axis A3 is disposed beneath the plane P1. Accordingly, during operation of the vehicle 10, debris can be susceptible to collecting on top of the left cushion bracket 62 between the left axle tube 22 and the cushion member 54 and becoming pinched between and damaging the left axle tube 22, the cushion member 54, and the left cushion bracket 62 when the cushion member 54 pivots towards the left axle tube 22 (e.g., when the swing arm assembly 12 is pivoted upwardly). The right cushion bracket can be similarly arranged.

As illustrated in FIGS. 2-3, left and right protrusions 72, 74 can be coupled with the left and right axle tubes 22, 24, respectively. The left and right protrusions 72, 74 can be located adjacent to the respective left and right cushion brackets 62, 64. As illustrated in FIG. 4, the left protrusion 72 can extend outwardly from the left axle tube 22 and can be disposed between the left axle tube 22 and the cushion member 54. In one embodiment, as illustrated in FIGS. 2-3, the left protrusion 72 can be an elongate protrusion that extends between the attachment flanges 66, 68. In another embodiment, the left protrusion 72 can extend beyond each of the vertical attachment flanges 66, 68 of the left cushion bracket 62.

Figure 5:
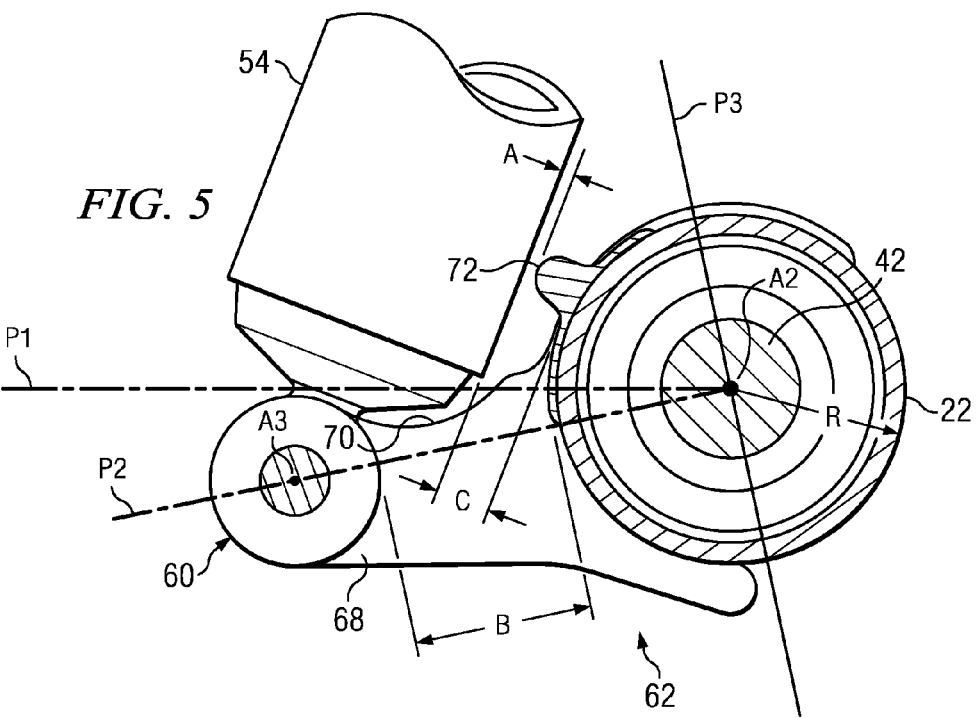
FIG. 5 is a cross-sectional view depicting the left axle tube, the cushion member, and the left cushion bracket of FIG. 3, but with the swing arm assembly pivoted upwardly such that the cushion member is overstroked.

As illustrated in FIG. 4, the left protrusion 72 can be spaced from the cushion member 54 by a distance A. When the cushion member 54 is compressed to its minimum length (e.g., overstroked), as illustrated in FIG. 5, the cushion member 54 can pivot towards the left axle tube 22 such that the cushion member 54 and the left protrusion 72 move towards each other to decrease the distance A. The distance A can have a minimum value that is defined as the minimum distance between the cushion member 54 and the left protrusion 72 for any given position of the cushion member 54.

As illustrated in FIGS. 4 and 5, the lower end 60 of the cushion member 54 can be spaced from the left axle tube 22 by a distance B. As illustrated in FIGS. 3-5, the axis A2 and the axis A3 can reside within a plane P2. The distance B can have a minimum value that is defined as the shortest distance between the lower end 60 of the cushion member 54 and the left axle tube 22 as measured within the plane P2. The cushion member 54 can be spaced from the left axle tube 22 at a location above the plane P2 by a distance G. The distance C can have a minimum value that is defined as the minimum distance between the cushion member 54 and the left axle tube 22 for any given position of the cushion member 54. As illustrated in FIGS. 4 and 5, the distances B and C can be greater than the distance A during pivoting of the cushion member 54 towards the left axle tube 22. It will therefore be appreciated that the left axle tube 22, the cushion member 54, the left cushion bracket 62, and the left protrusion 74 can define a pathway for debris to fall through that remains narrowest between the left protrusion 72 and the cushion member 54 when the cushion member 54 is pivoted towards the left axle tube 22.

During operation of the vehicle 10, debris, that docs not fit between the left protrusion 72 and the cushion member 54 (e.g., debris larger than the distance A) can be prevented from falling past the left protrusion 72 and coming to rest on top of the left cushion bracket 62. In some instances, the debris merely falls away from the cushion member 54 and the left cushion member bracket 62. However, in other instances, the debris can come to rest on top of the left protrusion 72 and against the cushion member 54. In these instances, when the cushion member 54 pivots towards the left axle tube 22, the left protrusion 72 and the cushion member 54 move closer together which can push the debris upwardly and to either side of the left protrusion 72 where in can fall away from the left cushion member bracket 62 and to the ground below.

It will be appreciated however, that debris that fits between the left protrusion 72 and the cushion member 54 (e.g., debris smaller than the distance A) can be permitted to fall past the left protrusion 72 and into the area between the left axle tube 22 and the cushion member 54. The debris can either fall between the attachment flanges 66, 68 (e.g., if the debris is small enough) or can fall over a side of the left cushion bracket 62 (e.g., if the debris is too large to fit between the attachment flanges 66, 68 before the cushion 54 can pivot towards the left axle tube 22 and pinch the debris. Therefore, debris that fits between the left protrusion 72 and the cushion member 54 is less prone to becoming lodged between the left axle tube 22 and the cushion member 54 and is thus free to fall away from the left cushion bracket 62. It will be appreciated, that if debris comes to rest onto top of the left cushion member 62 pivoting the cushion member 54 towards the left axle tube 22 (e.g., when the swing arm assembly 12 pivots upwardly, as illustrated in FIG. 5) can move the left protrusion 72 towards the debris which can eventually push the debris from the left cushion bracket 62 before the debris becomes pinched.

The swing arm assembly 12 is shown to be in a nominal position (e.g., the vehicle 10 at rest and supporting a rider) in FIGS. 1 and 4. When the swing arm assembly 12 is pivoted downwardly from its nominal position (e.g., to maintain contact between the rear wheels 51 and the roadway), the cushion member 54 can pivot away from the left axle tube 22, and the left protrusion 72 and the cushion member 54 can move away from each other thereby increasing the distance A. Debris resting on top of the left protrusion 72 and against the cushion member 54 (e.g., debris larger than the distance A) might be permitted to fall past the left protrusion 72 and into the area between the left axle tube 22 and the cushion member 54. However, the distances B and C can remain greater than the distance A during downward pivoting of the swing arm member 12 (e.g., from its nominal position to a fully unloaded position). Therefore, when the swing arm assembly 12 pivots downwardly with respect to the frame 14, debris that is permitted to drop past the left protrusion 72 (as a result of the left protrusion 72 and the cushion member 54 moving apart) can still be prone to falling from the top of the left cushion bracket 62 as explained above. Moreover, once the swing arm assembly 12 begins pivoting upwardly again, such as to return to its nominal position, the left protrusion 72 can contact any remaining debris to push the debris off of the left cushion bracket 62, as described above.

As illustrated in FIGS. 3-5, a plane P3 can be substantially perpendicular to the plane P2. The intersection between the planes P2 and P3 can be defined by the axis A2 (e.g., the axis A2 can reside within each of the planes P2 and P3). The left cushion bracket 62 can extend from the left axle tube 22 such that the axis A3 of the lower end 60 of the cushion member 54 is disposed generally beneath the plane P1. In one embodiment, as illustrated in FIGS. 3-5, the left protrusion 72 can be located above the plane P1 and forwardly of the plane P3. As illustrated in FIGS. 4 and 5, the left protrusion 72 can be arranged such that it is spaced from the plane P1 by a distance D that is at least one-tenth the radius R of the left axle tube 22. The minimum value for the distance D can be the shortest distance between the left protrusion 72 and the plane P1.

In one embodiment, as illustrated in FIG. 4, the left protrusion 72 can extend from the left axle tube 22 by a thickness T. The thickness T of the left protrusion 72 can be sufficient enough to ensure that the distances B and C are greater than the distance A for the entire range of pivoting of the swing arm assembly 12. For example, when the spacing between the cushion member 54 and the left protrusion 72 is at a maximum, such as when the cushion member 54 is in a fully extended position (e.g., when the cushion member 54 is in a fully unsprung condition), the thickness T of the distance A is still less than the distances B and C. In another embodiment, the left cushion bracket 62 can be configured to prevent the left protrusion 72 and the cushion member 54 from moving away from each other such that distance A is greater than distances B and C. For example, the left cushion bracket 62 can be arranged such that when the swing arm assembly 12 is pivoted to the fully unloaded position, the axis A3 remains beneath the plane P3.

Figure 6:
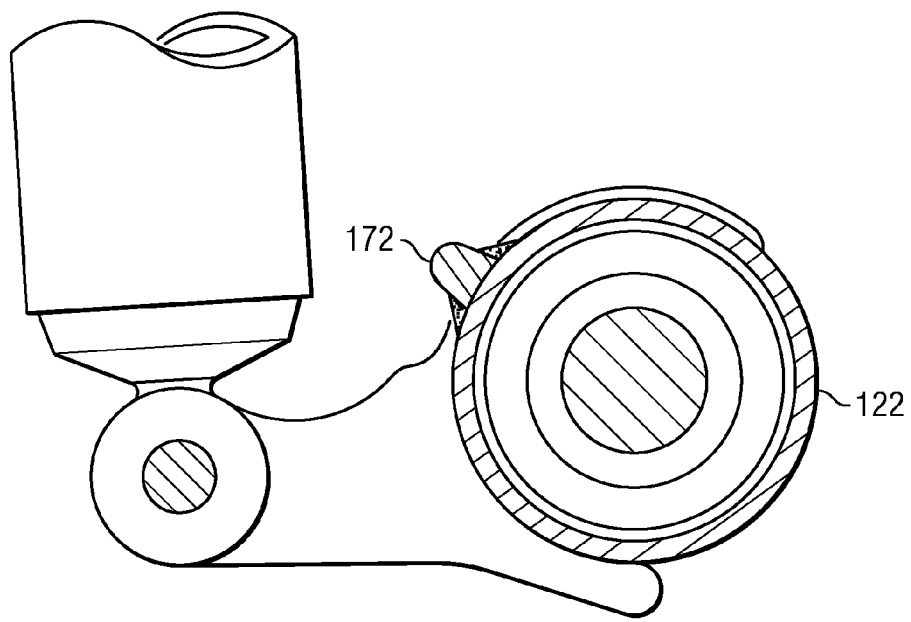
FIG. 6 is cross-sectional view of a left axle tube, a cushion member, and a left cushion bracket, according to another embodiment.
Figure 7:
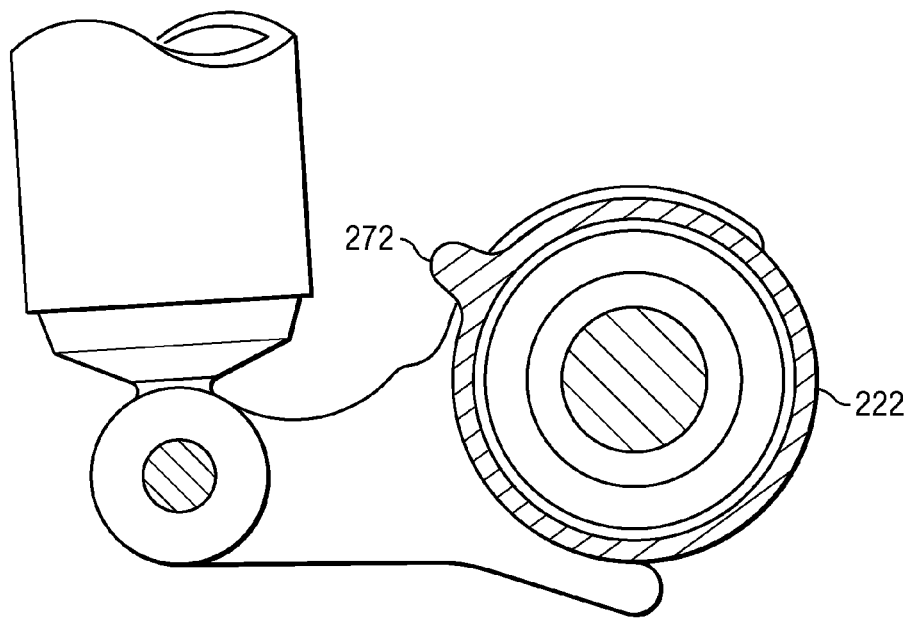
FIG. 7 is cross-sectional view of a left axle, tube, a cushion member, and a left cushion bracket, according to yet another embodiment.

It will be appreciated that the left protrusion 72 can comprise any of a variety of materials and can be coupled with the left axle tube 22 in any of a variety of suitable arrangements. In one embodiment, the left protrusion 72 can be formed of elastomeric material and attached to the respective left axle tube 22 (e.g., with adhesive) as illustrated in FIGS. 4 and 5. In an alternative embodiment, as illustrated in FIG. 6, a left protrusion 172 can be formed from a metal material (e.g., steel) and welded to the left axle tube 122. In yet another alternative embodiment, as illustrated in FIG. 7, a left protrusion 272 can be formed as a one-piece construction with the left axle tube 222 such as by forming a weld bead upon the left axle tube 222, for example.

It will be appreciated that the right cushion bracket 64 and the right protrusion 74 can be similar in many respects to the left cushion bracket 62 and the left protrusion 72 described above, except associated with the right axle tube 24 and disposed along a right side of the vehicle 10. For example, the right protrusion 74 can extend radially outwardly from the right axle tube 24 and can be disposed between the right axle tube 24 and the cushion member 54. The right protrusion 74 can be spaced from the cushion member 54 in such a manner that the narrowest distance between the right axle tube 24 and the cushion member 54 is at the right protrusion 74.

During operation of the vehicle 10, the right protrusion 74 and the cushion member 54 can cooperate to prevent large debris from falling between the right axle tube 24 and the cushion member 54. Smaller debris can fall past the right protrusion 74 and into the area between the right axle tube 24 and the cushion member 54 until it falls from the right cushion bracket 64 or is pushed by the right protrusion 74.

It will be appreciated that a swing arm assembly can be provided in any of a variety of other suitable configurations. For example, a swing arm assembly can include only a single swing member which is movably attached to a vehicle's frame. As another example, a swing arm assembly might include more than two swing members.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising:
   a frame;
   a swing member pivotally coupled with the frame and pivotable about a first axis;
   an axle tube coupled with the swing member and comprising a radius;
   a cushion bracket coupled with the axle tube; and
   a protrusion coupled with the axle tube adjacent the cushion bracket, the protrusion extending outwardly from the axle tube;
   an axle rotatably supported by the axle tube and rotatable about a second axis; and
   a cushion member comprising a lower end and an upper end, the upper end being pivotally coupled with the frame and the lower end being pivotally coupled with the cushion bracket and pivotable about a third axis; wherein:
   the second axis and the third axis reside in a first plane;
   the second axis resides in a second plane that is perpendicular to the first plane;
   the protrusion is located above the first plane;
   the cushion member is spaced from the protrusion by a first distance having a minimum value;
   the lower end of the cushion member is spaced from the axle tube by a second distance having a minimum value; and
   the minimum value of the first distance is less than the minimum value of the second distance.

2. The vehicle of claim 1 wherein the cushion member is spaced from the axle tube by a third distance having a minimum value, and the minimum value of the first distance is less than the minimum values of the second distance and the third distance.

3. The vehicle of claim 1 wherein the protrusion comprises an elongate protrusion.

4. The vehicle of claim 3 wherein the cushion bracket comprises a pair of attachment members and the protrusion extends between the attachment members.

5. The vehicle of claim 1 wherein the axle tube and the protrusion are formed together as a one-piece construction.

6. The vehicle of claim 1 wherein the first axis and the second axis reside in a third plane and the lower end of the cushion member is pivotally coupled with the cushion bracket such that the third axis is beneath the third plane.

7. The vehicle of claim 6 wherein the protrusion is spaced from the third plane by a fourth distance that is at least one-tenth the radius of the axle tube.

8. The vehicle of claim 6 wherein the protrusion is located above the third plane.

9. The vehicle of claim 1 wherein the protrusion is located forwardly of the second plane.

10. The vehicle of claim 1 wherein the cushion bracket extends forwardly of the axle tube.

11. A swing arm assembly comprising:
    an axle tube coupled with a swing member and comprising a radius;
    a cushion bracket coupled with the axle tube; and
    a protrusion coupled with the axle tube adjacent the cushion bracket, the protrusion extending outwardly from the axle tube;
    an axle rotatably supported by the axle tube and rotatable about a first axis; and
    a cushion member comprising a lower end and an upper end, the upper end being configured for pivotal coupling with a vehicular frame and the lower end being pivotally coupled with the cushion bracket and pivotable about a second axis; wherein:
    the first axis and the second axis reside in a first plane;

the second axis resides in a second plane that is perpendicular to the first plane;
the protrusion is located above the first plane;
the cushion member is spaced from the protrusion by a first distance having a minimum value;
the lower end of the cushion member is spaced from the axle tube by a second distance having a minimum value; and
the minimum value of the first distance is less than the minimum value of the second distance.

12. The swing arm assembly of claim 11 wherein the cushion member is spaced from the axle tube by a third distance having a minimum value, and the minimum value of the first distance is less than the minimum values of the second distance and the third distance.

13. The swing arm assembly of claim 11 wherein the protrusion comprises an elongate protrusion.

14. The swing arm assembly of claim 13 wherein the cushion bracket comprises a pair of attachment members and the protrusion extends between the attachment members.

15. The swing arm assembly of claim 11 wherein the axle tube and the protrusion are formed together as a one-piece construction.

16. The swing arm assembly of claim 11 wherein the protrusion is located above the first plane and forwardly of the second plane.

17. The swing arm assembly of claim 11 wherein the cushion bracket extends forwardly of the axle tube.

18. A vehicle comprising:
a frame;
a swing member pivotally coupled with the frame and pivotable about a first axis;
a left axle tube coupled with the swing member;
a right axle tube coupled with the swing member;
a left cushion bracket coupled with the left axle tube;
a right cushion bracket coupled with the right axle tube;
a left protrusion coupled with the left axle tube adjacent the left cushion bracket, the left protrusion extending outwardly from the left axle tube;
a right protrusion coupled with the right axle tube adjacent the right cushion bracket, the right protrusion extending outwardly from the right axle tube;
a left axle rotatably supported by the left axle tube and rotatable about a second axis;
a right axle rotatably supported by the right axle tube and rotatable about a third axis;
a pair of cushion members, each cushion member comprising a lower end and an upper end, the upper end of each cushion member being pivotally coupled with the frame, the lower end of one cushion member being pivotally coupled with the left cushion bracket and pivotable about a fourth axis, and the lower end of the other cushion member being pivotally coupled with the right cushion bracket and pivotable about a fifth axis; wherein:
the second axis and the fourth axis reside in a first plane;
the second axis resides in a second plane that is perpendicular to the first plane;
the third axis and the fifth axis reside in a third plane;
the third axis resides in a fourth plane that is perpendicular to the third plane;
the left protrusion is located above the first plane and forwardly of the second plane;
the right protrusion is located above the third plane and forwardly of the fourth plane;
the cushion member attached to the left cushion bracket is spaced from the left protrusion by a first distance having a minimum value;
the lower end of the cushion member attached to the left cushion bracket is spaced from the left axle tube by a second distance having a minimum value;
the cushion member attached to the left cushion bracket is spaced from the left axle tube by a third distance having a minimum value;
the cushion member attached to the right cushion bracket is spaced from the right protrusion by a fourth distance having a minimum value;
the lower end of the cushion member attached to the right cushion bracket is spaced from the right axle tube by a fifth distance having a minimum value;
the cushion member attached to the right cushion bracket is spaced from the right axle tube by a sixth distance having a minimum value;
the minimum value of the first distance is less than the minimum values of the second distance and the third distance; and
the minimum value of the fourth distance is less than the minimum values of the fifth distance and the sixth distance.

19. The vehicle of claim 18 wherein the left cushion bracket and the right cushion bracket each comprises a respective pair of attachment members.

20. The vehicle of claim 19 wherein the left axle tube and the left protrusion are formed together as a one-piece construction, and the right axle tube and the right protrusion are formed together as a one-piece construction.

* * * * *

UNITED STATES PATENT AND TRADEMARK OFFICE
CERTIFICATE OF CORRECTION

PATENT NO. : 8,398,101 B2
APPLICATION NO. : 13/023897
DATED : March 19, 2013
INVENTOR(S) : Alexander et al.

It is certified that error appears in the above-identified patent and that said Letters Patent is hereby corrected as shown below:

In the Specifications:

Column 1, line 51, change "tower" to --lower--;
Column 3, line 6, change "axle, tube" to --axle tube--;
Column 3, line 19, change "of" to --or--;
Column 3, line 20, change "include frame" to --include a frame--;
Column 4, line 26, change "axle, tube" to --axle tube--;
Column 4, line 55, change "lubes" to --tubes--;
Column 5, line 44, change "distance G" to --distance C--;
Column 5, line 57, change "debris, that" to --debris that--;
Column 5, line 57, change "docs" to --does--; and
Column 6, line 19, change "62 pivoting" to --62, pivoting--.

Signed and Sealed this
Fourteenth Day of May, 2013

Teresa Stanek Rea
*Acting Director of the United States Patent and Trademark Office*